(12) United States Patent
Barnett

(10) Patent No.: US 8,056,311 B1
(45) Date of Patent: Nov. 15, 2011

(54) TENSIONING OF THE TOP ROLL OF A CROP CONDITIONER

(75) Inventor: Neil Gordon Barnett, Winnipeg (CA)

(73) Assignee: MacDon Industries Ltd, Winnipeg, Manitoba (CA)

( * ) Notice: Subject to any disclaimer, the term of this patent is extended or adjusted under 35 U.S.C. 154(b) by 0 days.

(21) Appl. No.: 12/842,588

(22) Filed: Jul. 23, 2010

(51) Int. Cl.
*A01D 61/00* (2006.01)

(52) U.S. Cl. .................................. 56/16.4 C; 56/16.4 B

(58) Field of Classification Search .............. 56/16.4 C, 56/16.4 B, 16.4 R, 10.2 J, 14.1, 16.4 A; 241/294, 241/232, 895.2, 895.3, 37
See application file for complete search history.

(56) References Cited

U.S. PATENT DOCUMENTS

| | | | | |
|---|---|---|---|---|
| 3,101,578 A | * | 8/1963 | Johnston | 56/1 |
| 3,165,872 A | * | 1/1965 | Praca | 56/1 |
| 3,472,003 A | * | 10/1969 | Case | 56/1 |
| 3,474,601 A | * | 10/1969 | Burrough et al. | 56/1 |
| 3,747,310 A | * | 7/1973 | Calder | 56/16.4 A |
| 3,797,207 A | * | 3/1974 | Sawyer et al. | 56/1 |
| 4,035,991 A | * | 7/1977 | Oosterling et al. | 56/1 |
| 4,472,927 A | | 9/1984 | Vogt | |
| 4,516,392 A | | 5/1985 | McLean | |
| 4,524,780 A | * | 6/1985 | Warkentin | 460/131 |
| 4,546,599 A | * | 10/1985 | Cicci et al. | 56/16.4 R |
| 4,821,494 A | * | 4/1989 | O'Halloran et al. | 56/16.4 C |
| 4,843,804 A | * | 7/1989 | Wellman | 56/16.4 C |
| 4,896,483 A | | 1/1990 | O'Halloran | |
| 4,949,535 A | * | 8/1990 | Hurlburt | 56/16.4 R |
| 4,961,303 A | * | 10/1990 | McCarty et al. | 56/14.1 |
| 5,022,219 A | | 6/1991 | Knurr | |
| 5,033,257 A | * | 7/1991 | Walters | 56/16.4 R |
| 5,435,239 A | * | 7/1995 | Talbot | 99/618 |
| 5,531,062 A | * | 7/1996 | Pfrimmer | 56/16.4 B |
| 6,158,201 A | * | 12/2000 | Pruitt et al. | 56/6 |
| 6,220,007 B1 | * | 4/2001 | Doerr et al. | 56/16.4 C |
| 6,715,271 B2 | * | 4/2004 | Mellin | 56/16.4 B |
| 6,996,961 B2 | * | 2/2006 | Nickel et al. | 56/16.4 C |
| 7,188,461 B2 | | 3/2007 | Fox | |
| 7,322,175 B2 | * | 1/2008 | Ferre et al. | 56/16.4 B |

* cited by examiner

*Primary Examiner* — Arpad Fabian-Kovacs
(74) *Attorney, Agent, or Firm* — Adrian D. Battison; Ade & Company Inc.

(57) ABSTRACT

A crop conditioner includes a frame mounting a bottom fixed roller and a top liftable roller. The top roller is liftable at each end on a pivot member tensioned by a tension link, a tension spring and a bell crank connected between the tension link and the spring. The bell crank is mounted on the conditioner frame for pivotal movement about a pivot axis which lies transversely to a line parallel to the pivot axis of the second roller so that the bell crank extends from the tension link to the tension spring in a direction outwardly of the radial plane of the roller pivot axis. The spring extends upwardly and forwardly from the bell crank pivot at a rear flange of the frame to an adjustment screw of the spring at a top flange of the frame immediately adjacent an adjustment of a bottom stop of the top roller.

18 Claims, 4 Drawing Sheets

TENSIONING OF THE TOP ROLL OF A CROP CONDITIONER

This invention relates to a crop conditioner including two generally parallel rolls forming a nip through which the crop passes with one of the rollers being movable to increase the width of the nip, and particularly to a tensioning arrangement for applying tension to the movable roller.

BACKGROUND OF THE INVENTION

Hay conditioners generally include a pair of rollers mounted in co-extensive parallel relationship for rotation about respective axes with the crop arranged to pass between the rollers in a conditioning action.

Each of the rollers generally carries a plurality of longitudinally extending angularly spaced flutes which project outwardly from the surface of the roller. The rollers are spaced by a set distance at the nip such that the flutes intermesh generally without contact between the rollers. The intermeshing of the flutes causes the crop material to be bent as it passes between the rollers causing a cracking of the waxy surface of the crop stem.

It is necessary in such rollers to allow one of the rollers, generally the top roller, to move in a direction to increase the width of the nip by increasing the spacing between the axes of the rollers, to accommodate different amounts of crop material passing between the rollers and to accommodate obstacles such as stones and sticks which pass through without causing damage to the rollers. Generally this movement is provided by carrying each end of the top roller on a pivot arm or pivot plate which allows pivotal movement about an axis parallel to the axis of the roller together with a spring biasing system which applies tension to the top roller acting to close the nip while allowing each end independently to rise and lower in a floating action.

U.S. Pat. No. 7,188,461 (Fox) assigned to the present assignee and issued Mar. 13, 2007 discloses an arrangement of this type where the top roller is spring biased downwardly into contact with the crop by a pair of springs operating at opposite ends of the top roller. Each spring is mounted within a transverse beam across the conditioner. The springs extend from an inner end carried on a bracket attached to the beam to an outer end which carries a threaded rod which extends from the outer end of the spring to the outer end of a pivotal link. Thus the spring pulls inwardly holding the structure in the closed position. In the event that the link is pivoted outwardly by lifting of the end of the roller, the rod is moved outwardly thus tensioning the spring.

U.S. Pat. No. 5,022,219 (Knurr) assigned to Gehl and issued Jun. 11, 1991 discloses an arrangement of this type where a conditioner having first and second conditioning rolls, one of which is movably mounted, includes a mounting system for selectively urging the movable roll toward the other roll. The mounting system includes a pair of mounting plates adapted for placement one on either side of the movable roll, with the mounting plates being pivotally mounted to a frame. A hydraulically operated adjustment arrangement is connected to the mounting plates to relieve the biasing force exerted on the mounting plates, thus allowing movement of the movable roll away from the other roll to accommodate passage of a mass of material therethrough.

U.S. Pat. No. 4,896,483 (O'Halloran) assigned to Hay and Forage and issued Jan. 30, 1990 discloses a crop conditioner having a frame and first and second rolls each rotatable about an axis of rotation. A mounting assembly for the first roll includes a sub-assembly at each end of the first roll which permit the first roll to be pivoted relative to the second roll. Each sub-assembly has a mounting plate rotatably supporting one end of the first roll and supported on the frame for pivotal movement about a pivot axis which is generally parallel to and displaced from the axis of rotation of the first roll such that the axis of rotation of the first roll is movable relative to the axis of rotation of the second roll between a first position, a second position and a third position. The second and third positions of the first roll are progressively farther away from the axis of rotation of the second roll than the first position. A spring extending generally parallel to the axis of the rolls exerts a biasing force on the mounting plate through a cam plate to press the first roll toward the second roll. The spring and cam plate are arranged so that the biasing force has a magnitude which is less when the first roll is located between the second and third positions than when the first roll is located between the first and second positions.

U.S. Pat. No. 4,472,927 (Vogt) assigned to Deere and issued Sep. 25, 1984 discloses a hay conditioner of typical construction which discloses very schematically a spring for tensioning the top roll onto the bottom roll through a bell crank and a link. The upper roll is free to move upwardly in response to crops passing between the rolls, but its downward movement is limited to the stopped position selected by an adjustment link with the link extending upwardly to a free end that is accessible to receive a wrench.

U.S. Pat. No. 4,516,392 (McLean) assigned to Sperry New Holland and issued May 14, 1995 discloses a mower-conditioner having a pair of rotatable conditioning rolls where the bearings rotatably supporting each conditioning roll are recessed into the end of the conditioning roll.

SUMMARY OF THE INVENTION

It is one object of the present invention, therefore, to provide a tensioning arrangement for applying tension to the movable roller a crop conditioner.

According to a aspect of the invention there is provided a conditioner for conditioning cut crop material from a harvester comprising:

a conditioner frame;

a first roller mounted in the conditioner frame for rotation about an axis of the first roller with the axis being mounted in fixed position in the frame;

a second roller mounted in the conditioner frame for rotation about an axis of the second roller;

a drive input for driving rotation of at least one of the first and second rollers;

each respective end of the second roller being mounted on a respective mounting assembly arranged to allow movement of the respective end of the second roller relative to the first roller in a direction to increase and decrease spacing between the axes of the first and second rollers;

each mounting assembly including:

a pivotal mounting member arranged to allow pivotal movement of the respective end of the second roller about a roller pivot axis generally parallel to the axis of the second roller and offset to one side thereof;

a tension link extending in a direction lying substantially in a radial plane of the roller pivot axis and having one end connected to the pivotal mounting member so as to apply a force to the pivotal mounting member in a direction to move the second roller toward the first roller;

a tension spring for applying spring force to the tension link;

a bell crank mounted on the conditioner frame for pivotal movement of the bell crank, the bell crank having a first end connected to the tension link and a second end connected to the spring;

the bell crank having a crank pivot axis which lies transversely to a line at the bell crank parallel to the pivot axis of the second roller;

the bell crank extending from the first end to the second end in a direction outwardly of the radial plane of the roller pivot axis.

Preferably the crank pivot axis is directly or approximately parallel to the radial plane of the roller pivot axis, that is approximately at right angles to the pivot axis. This is contrary to conventional arrangements in which the axis is parallel to the roller axes and provides significant advantages as set out hereinafter.

Preferably the tension link extends generally downwardly from the pivotal mounting member.

Preferably the tension spring extends generally upwardly from the second end of the bell crank.

Preferably the tension spring is generally parallel to the tension link and has its end connected to the second end of the bell crank outward from the tension link in a direction away from the radial plane of the roller pivot axis.

Preferably the tension spring extends from the second end of the bell crank upwardly to a mounting point at a position on the conditioner frame at height above the second roller.

Preferably the mounting point is inward of the second end of the bell crank.

Preferably there is provided a stop assembly for limiting movement of the second roller in a direction toward the first roller, the stop assembly includes an adjustment link extending to an adjustment point at a top of the conditioner frame above the second roller and the mounting point is located on the frame adjacent the adjustment point.

Preferably the stop assembly includes a plate with a hole therein defining a path of movement of the second roller and the adjustment link is arranged to move the plate.

Preferably the conditioner frame includes at each end an end plate in a radial plane of the axes of the first and second rollers and includes a top flange at right angles to the end plate and projecting outwardly therefrom, and the mounting point and the adjustment point are connected to the top flange.

Preferably the conditioner frame includes a rear flange at right angles to the end plate and projecting outwardly therefrom, and a mounting for the roller pivot axis and a mounting for the crank pivot axis are located at the rear flange so that the tension link and the tension spring extend upwardly and forwardly from the rear flange.

Preferably each roller has a generally cylindrical roller surface and a plurality of side by side flutes at angularly spaced positions therearound, the flutes projecting radially outwardly to a flute edge spaced outwardly of the roller surface and extending generally longitudinally along the roller substantially along the full length thereof. Alternatively the rollers may be plain with no flutes so that the conditioning action occurs by crushing. Plain rollers can be smooth or may include small striations or ribs. The rollers are preferably of metal but can be formed of a resilient rubber material. The term "nip" used herein is not intended to require a line of contact between the roller, but is intended to include rollers where they approach but do not touch such as the above fluted rollers which typically condition by cracking the crop by bending rather than by crushing.

Thus, as described in more detail hereinafter, the roller tension spring is mounted in a generally vertical configuration. The spring pulls on the bell crank which applies a downward force on the top conditioner roll arm via the tension link. The plane of action of the tension mechanism is generally perpendicular to the plane of action of the roll mounting mechanism. The tension adjustment of the downward pressure on the top conditioner roll can be adjusted easily from the top of the header, close to the location of the roll gap adjustment.

The bell crank system allows for better control of down force applied to the top conditioner roll arm through opening range.

The arrangement which causes the tension mechanism to operate perpendicular to the roll support mechanism allows for more optimal spatial design and an easier adjustment of roll down force.

Key elements therefore which may be obtained in this linkage by the arrangement described hereinafter are:

1. Control of forces on arm through manipulation of the bell crank.
2. A compact design integral to side of the conditioner.
3. The linkage works in a plane parallel to the rolls so less cross sectional space is required for the tension mechanism. The tension mechanism does not interfere as much with the drive mechanism, or the roll opening.
4. Easier adjustment from on top.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
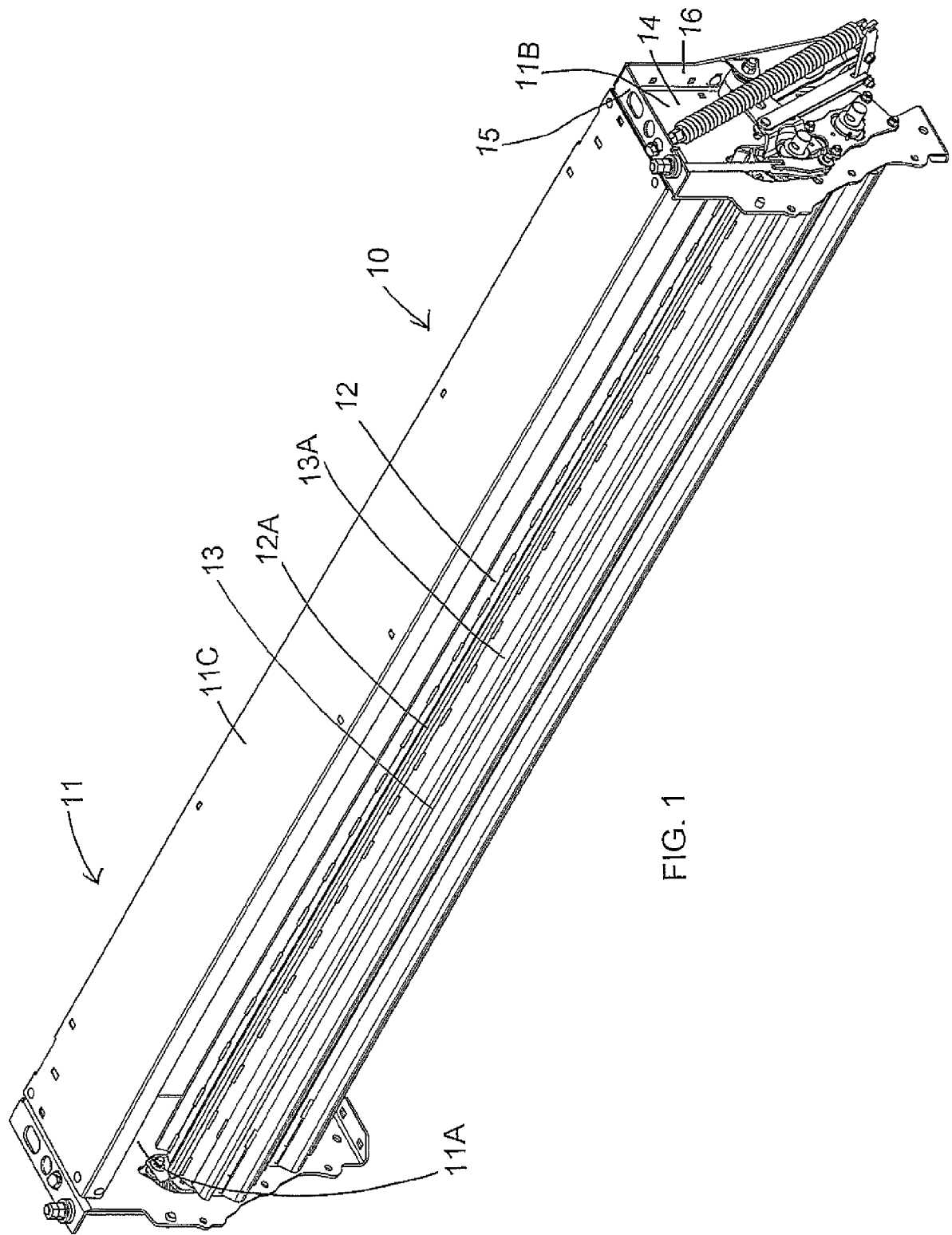
FIG. 1 is an isometric view of one embodiment of a conditioner according to the present invention.
Figure 2:
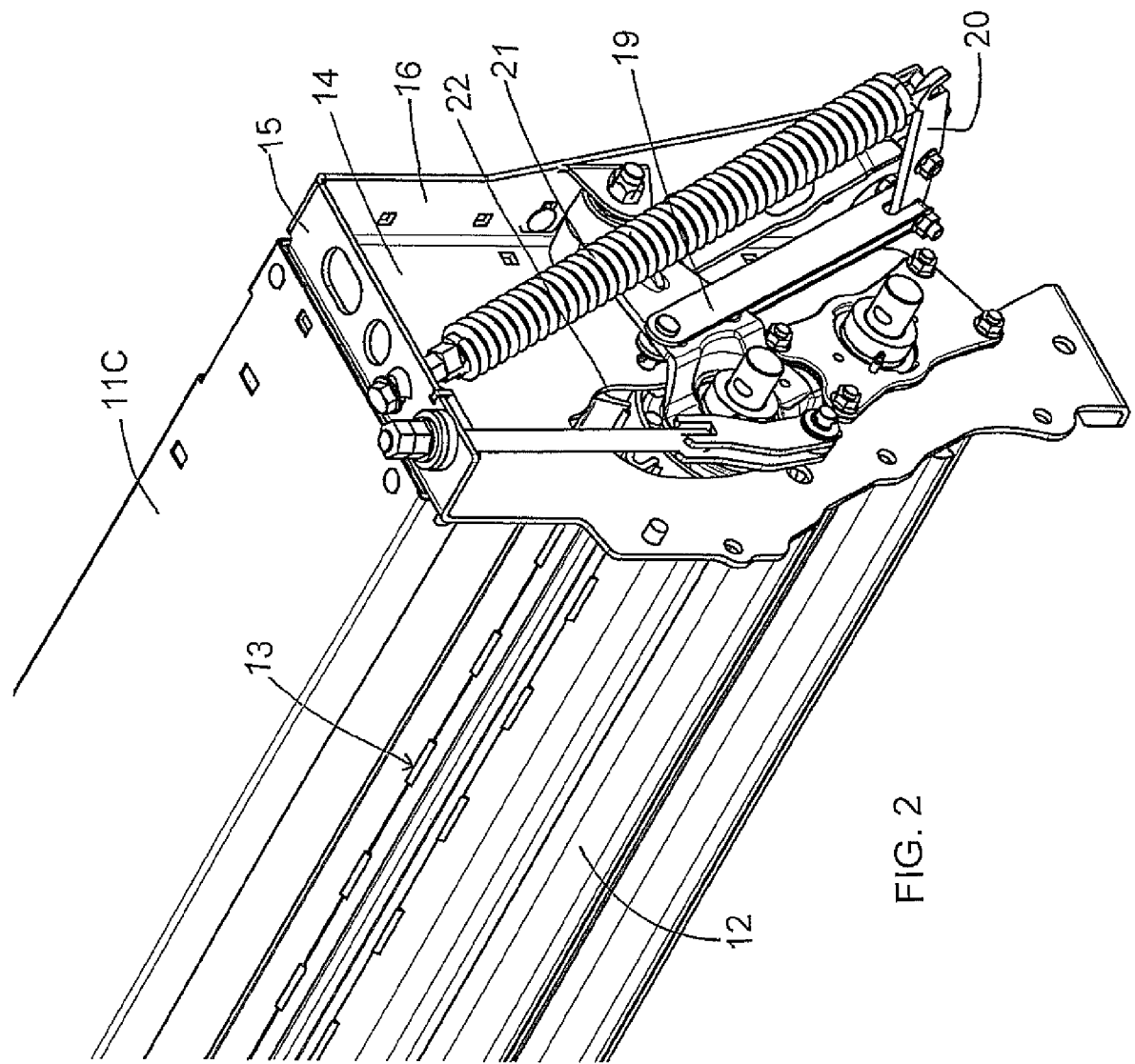
FIG. 2 is an isometric view on an enlarged scale of the conditioner of FIG. 1 showing the drive end.
Figure 3:
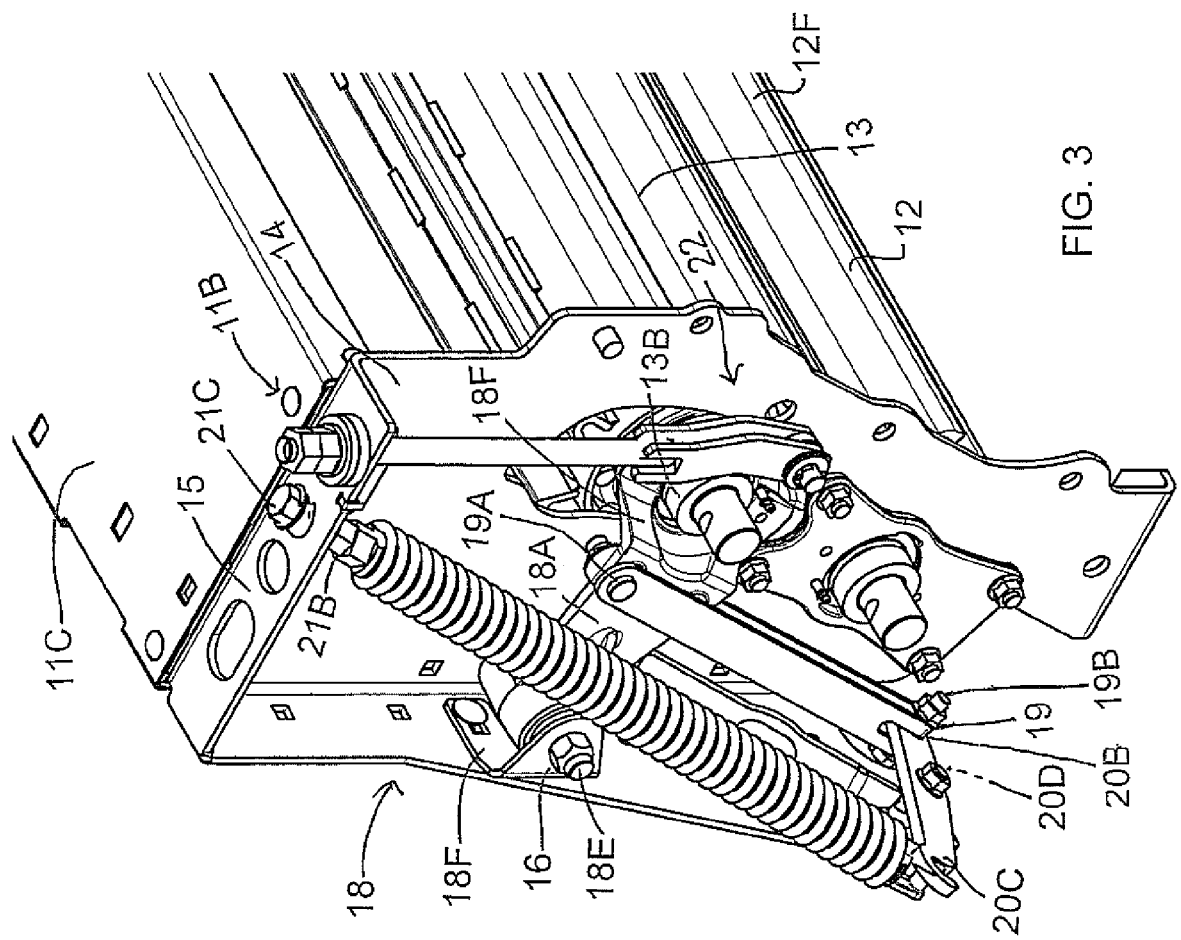
FIG. 3 is an isometric view on an enlarged scale of the conditioner of FIG. 1 showing the non-drive end.
Figure 4:
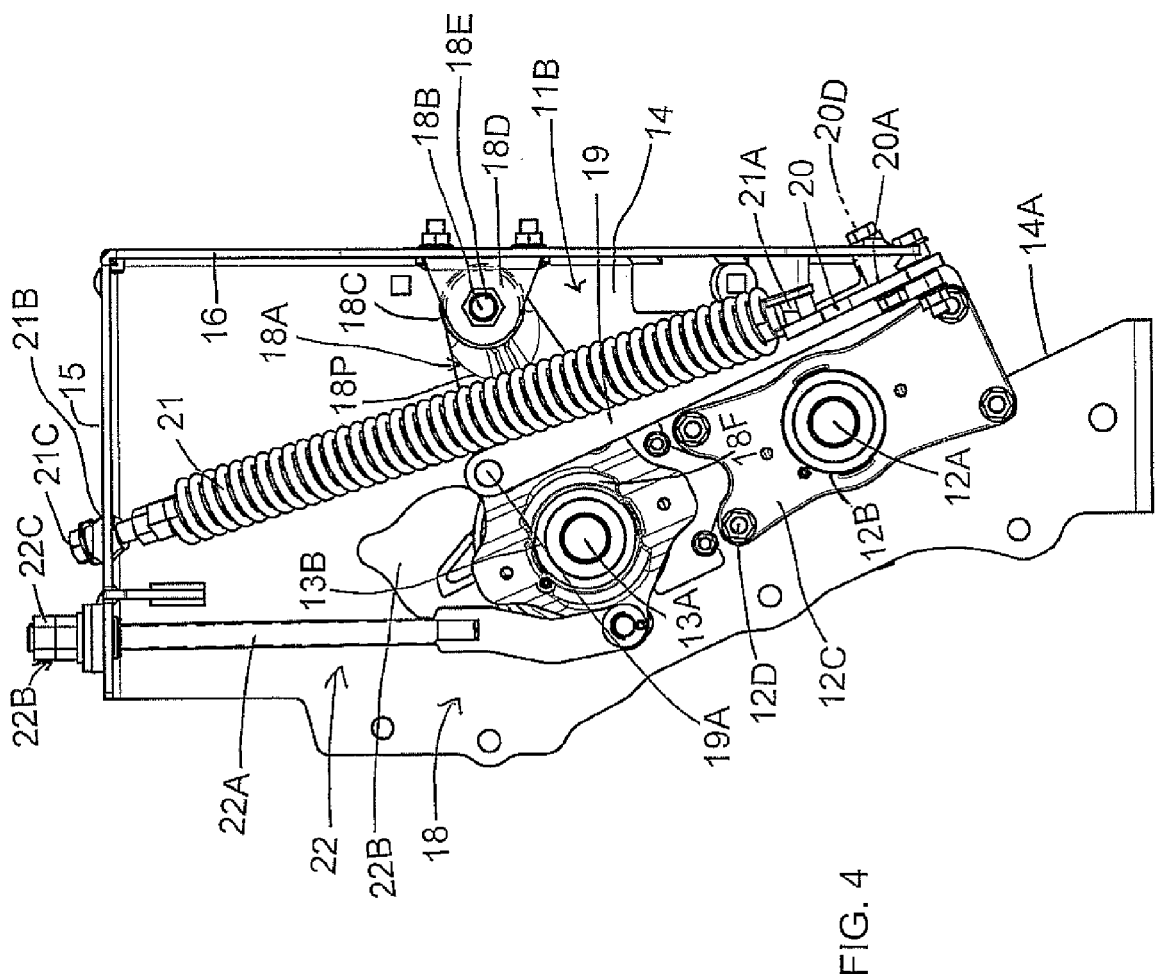
FIG. 4 is an end elevational view of the conditioner of FIG. 1 at the non drive end of FIG. 3.

A conditioner 10 for conditioning cut crop material from a harvester is shown in the figures and is arranged to be mounted behind the cutter bar of a harvesting machine with a discharge opening of the machine.

Examples of machines of this type are disclosed in the following documents of the present Assignees.

U.S. Pat. No. 7,340,876 issued Mar. 11, 2008 which corresponds to US Published Application 2008/0066440 filed Sep. 15, 2006 and published Mar. 23, 2008 and to Canadian application 2,559,353 discloses an arrangement which provides impellers of an hour glass shape arranged at the outer cutter disks. The disclosure of this document is incorporated herein by reference.

U.S. Pat. No. 7,454,888 issued Nov. 25, 2008 which corresponds to US Published Application 2008/0066441 filed Sep. 15, 2006 and published Mar. 23, 2008 and to Canadian application 2,559,217 discloses an arrangement which provides a transfer roller between the cutter disks and the conditioning rollers where the transfer roller is of the same diameter as the bottom roll and carries high ribs preferably forwardly inclined for an aggressive action on the crop. The roller is mounted with its axis above the cutting plane and its uppermost edge of the ribs at or above the axis of the bottom roll. The disclosure of this document is incorporated herein by reference.

U.S. Pat. No. 7,356,982 issued Apr. 15, 2008 which corresponds to US Published Application 2008/0066439 filed Feb. 15, 2007 and published Mar. 23, 2008 and to Canadian application 2,578,907 discloses another arrangement which provides impellers of an hour glass shape arranged at the outer cutter disks. The disclosure of this document is incorporated herein by reference.

US Published Application 2009/0071116 filed Jul. 23, 2008 and published Mar. 23, 2009 which corresponds to Canadian application 2,639,032 discloses an arrangement where a swath converging apparatus is mounted in the mouth of the opening and is formed by two pairs of upstanding cylindrical rollers rotatable about their axes in a direction to carry the crop inwardly of the discharge opening. The pairs are mounted on respective top and bottom plates which pivot about the axis of the outer roller with the latter extending forwardly to overlap a floor plate of the cutter bar. The disclosure of this document is incorporated herein by reference.

The conditioner 10 includes a conditioner frame 11 defined by end frame elements 11A and 11B together with suitable transverse connecting elements 11C. The frame supports a pair of rollers 12 and 13 each mounted for rotation about a respective longitudinal axis 12A, 13A.

Each end frame element includes a main upstanding plate 14 at right angles to the axes 12A, 13A at the ends of the rollers together with a rear flange 16 at a rear edge of the plate 14 and a top flange 15 at a top edge of the plate with the flanges extending outwardly from the main plate.

The conditioner rollers 12, 13 are of the fluted intermeshing type with flutes 12F arranged along the roller in helical manner and formed from a bar or angle welded onto the outer surface of the roller.

The first or bottom roller 12 is mounted in the conditioner frame for rotation about the axis 12A of the first roller with the axis 12A being mounted in fixed position in the frame. The roller is carries in bearings 12B carried on a bearing mounting plate 12C attached to the end plate 14 at a fixed position thereon. Thus the plate 14 has a bottom slot 14A extending upwardly and forwardly from the bottom of the rear flange 16 into which the bearing slides with the plate 12C being attached to the plate 14 on either side of the slot by bolts 12D.

The second or top roller 13 is mounted in the conditioner frame for rotation about the axis 13A of the second roller. Each respective end of the second roller 13 is mounted on a respective mounting assembly 18 arranged to allow up and down movement of the respective end of the top roller relative to the bottom roller in a direction to increase and decrease spacing between the axes 12A and 13A of the rollers.

The roller 13 is carried in bearings 13B which are mounted on a pivotal mounting member 18A arranged to allow pivotal movement of the end of the top roller about a roller pivot axis 18B generally parallel to the axis 13A of the second roller and offset to one side thereof. The mounting member 18A comprises a formed plate 18P with a sleeve 18C at one end which contains a bearing 18D mounted on a pin 18E carried on a bracket 18F bolted to the rear flange 16. The plate 18P is thus carried on the end plate 14 parallel to the plate 14 but spaced outwardly from that plate. A bifurcated support portion 18F is formed integrally with the plate 18P and extends toward the plate 14 where it supports the bearings 13B.

A tension link 19 is connected to the plate 18F at a pin 19A and extends downwardly therefrom to a bell crank 20 to which is attached by a pin 19B. The link 19 extends in a direction lying substantially in a radial plane of the roller pivot axis 12A and has its upper end connected to the pivotal mounting plate 18P so as to apply a force to the pivotal mounting member 18A downwardly, that is, in a direction to move the top roller downwardly toward the bottom roller.

The bell crank 20 is connected to a tension spring 21 for applying spring force to the tension link. The bell crank 20 is mounted on the conditioner frame by a bushing 21A for pivotal movement of the bell crank. The bushing 21A is mounted at the bottom of the rear flange 16. The bell crank 20 has a first end 20B connected to the tension link at the pin 19B and a second end 20C connected to the spring at a bottom connection 21A.

The bell crank having a crank pivot axis 20D defined by the bushing 20A which lies transversely to a line L at the bell crank parallel to the pivot axis of the second roller, that is, the bell crank extends from the first end at the pin 19B to the second end at the connection 21A in a direction outwardly of the radial plane of the roller pivot axis.

This is contrary to the conventional arrangement in which a bell crank lies in a radial plane of the roller axis with its pivot axis parallel to the roller axis. In the arrangement shown, the crank pivot axis 20D is directly parallel, at 0 degrees, to the radial plane of the roller pivot axis. However this angle is not necessarily zero and there may be some twisting of the various components to provide an improved geometry which mean that this is not necessarily so.

The spring 21 extends from its connection 21A to the bell crank at the lower end upwardly and forwardly to an upper end 21B where it is connected to the top flange 15 by an adjustment screw 21C. Thus tension generated by the tension spring is applied through the bell crank to the tension link acting to pull downwardly on the roller 13.

The tension link 19 extends generally downwardly from the pivotal mounting member 18A and the tension spring 21 extends generally upwardly from the second end of the bell crank to the top flange 15.

The tension spring 21 is generally parallel to the tension link 19 and has its lower end 21A outward from the lower end of the tension link 19 in a direction away from or outwardly from the radial plane of the roller pivot axis at the bearings 13B. The mounting point 21B is inward of the connection 21A at the outer end of the bell crank so that the spring is inclined upwardly and inwardly.

A stop assembly 22 is provided for limiting movement of the top roller 13 downwardly toward the bottom roller 12. The stop assembly includes an adjustment link 22A extending to a screw 22C at an adjustment point 22B at the top flange 15 of the conditioner frame above the top roller. Thus the top end 21B of the spring and its mounting point at the adjustment nut 21C is located on the frame adjacent the adjustment point 22B. In this way both adjustments are readily available at the top flange 15 for adjustment from above the flange.

The stop assembly 22 includes a plate 22B with a hole 22C therein defining a path of movement of the top roller 13. The adjustment link 22A when adjusted by the screw 22C is arranged to move the plate upwardly and downwardly to locate the bottom of the hole 22C which locates the lowest point of movement of the roller 13 which is allowed by the plate 22B.

A drive system 30 is provided and shown only schematically since this can be of any suitable arrangement for driving the rollers 12 and 13.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A conditioner for conditioning cut crop material from a harvester comprising:
a conditioner frame;
a first roller mounted in the conditioner frame for rotation about an axis of the first roller with the axis being mounted in fixed position in the frame;
a second roller mounted in the conditioner frame for rotation about an axis of the second roller;
a drive input for driving rotation of at least one of the first and second rollers;
each respective end of the second roller being mounted on a respective mounting assembly arranged to allow movement of the respective end of the second roller relative to the first roller in a direction to increase and decrease spacing between the axes of the first and second rollers;
each mounting assembly including:
a pivotal mounting member arranged to allow pivotal movement of the respective end of the second roller about a roller pivot axis generally parallel to the axis of the second roller and offset to one side thereof;
a tension link extending in a direction lying substantially in a radial plane of the roller pivot axis and having one end connected to the pivotal mounting member so as to apply a force to the pivotal mounting member in a direction to move the second roller toward the first roller;
a tension spring for applying spring force to the tension link;
a bell crank mounted on the conditioner frame for pivotal movement of the bell crank, the bell crank having a first end connected to the tension link and a second end connected to the spring;
the bell crank having a crank pivot axis which lies transversely to a line at the bell crank parallel to the pivot axis of the second roller;
the bell crank extending from the first end to the second end in a direction outwardly of the radial plane of the roller pivot axis;
wherein the tension spring is generally parallel to the tension link and has its end connected to the second end of the bell crank outward from the tension link in a direction away from the radial plane of the roller pivot axis.

2. The conditioner according to claim 1 wherein the crank pivot axis is at right angles to the roller pivot axis.

3. The conditioner according to claim 1 wherein the tension link extends generally downwardly from the pivotal mounting member.

4. The conditioner according to claim 1 wherein the tension spring extends generally upwardly from the second end of the bell crank.

5. The conditioner according to claim 1 wherein the tension spring extends from the second end of the bell crank upwardly to a mounting point at a position on the conditioner frame at height above the second roller.

6. The conditioner according to claim 5 wherein the mounting point is inward of the second end of the bell crank.

7. The conditioner according to claim 5 wherein there is provided a stop assembly for limiting movement of the second roller in a direction toward the first roller, wherein the stop assembly includes an adjustment link extending to an adjustment point at a top of the conditioner frame above the second roller and wherein the mounting point is located on the frame adjacent the adjustment point.

8. The conditioner according to claim 7 wherein the stop assembly includes a plate with a hole therein defining a path of movement of the second roller and wherein the adjustment link is arranged to move the plate.

9. The conditioner according to claim 7 wherein the conditioner frame includes at each end an end plate in a radial plane of the axes of the first and second rollers and includes a top flange at right angles to the end plate and projecting outwardly therefrom, and wherein the mounting point and the adjustment point are connected to the top flange.

10. The conditioner according to claim 1 wherein the conditioner frame includes at each end an end plate in a radial plane of the axes of the first and second rollers and includes a rear flange at right angles to the end plate and projecting outwardly therefrom, and wherein a mounting for the roller pivot axis and a mounting for the crank pivot axis are located at the rear flange so that the tension link and the tension spring extend upwardly and forwardly from the rear flange.

11. The conditioner according to claim 1 wherein each roller has a generally cylindrical roller surface and a plurality of side by side flutes at angularly spaced positions therearound, the flutes projecting radially outwardly to a flute edge spaced outwardly of the roller surface and extending generally longitudinally along the roller substantially along the full length thereof.

12. A conditioner for conditioning cut crop material from a harvester comprising:
a conditioner frame;
a first roller mounted in the conditioner frame for rotation about an axis of the first roller with the axis being mounted in fixed position in the frame;
a second roller mounted in the conditioner frame above the first roller for rotation about an axis of the second roller;
a drive input for driving rotation of at least one of the first and second rollers;
each respective end of the second roller being mounted on a respective mounting assembly arranged to allow upward movement of the respective end of the second roller relative to the first roller to increase and decrease spacing between the axes of the first and second rollers;
each mounting assembly including:
a pivotal mounting member arranged to allow said upward movement of the respective end of the second roller about a roller pivot axis generally parallel to the axis of the second roller and offset to one side thereof;
a tension link lying substantially in a radial plane of the roller pivot axis and having an upper end connected to the pivotal mounting member and extending downwardly therefrom so as to apply a downward force to the pivotal mounting member to move the second roller toward the first roller;
a tension spring for applying spring force to the tension link;
a bell crank mounted on the conditioner frame for pivotal movement of the bell crank, the bell crank having a first end connected to the tension link and a second end connected to the spring;
wherein the bell crank is located below the first roller and the tension link extends downwardly from the pivotal mounting member to the bell crank
and wherein the tension spring extends upwardly from the second end of the bell crank to a mounting point on the conditioner frame above the second roller.

13. The conditioner according to claim 12 wherein the bell crank has a pivot axis at right angles to the roller pivot axis.

14. The conditioner according to claim 12 wherein there is provided a stop assembly for limiting movement of the second roller in a direction toward the first roller, wherein the stop assembly includes an adjustment link extending to an adjustment point at a top of the conditioner frame above the second roller and wherein the mounting point is located on the frame adjacent the adjustment point.

15. The conditioner according to claim 12 wherein each roller has a generally cylindrical roller surface and a plurality of side by side flutes at angularly spaced positions therearound, the flutes projecting radially outwardly to a flute edge spaced outwardly of the roller surface and extending generally longitudinally along the roller substantially along the full length thereof.

16. A conditioner for conditioning cut crop material from a harvester comprising:
- a conditioner frame;
- a first roller mounted in the conditioner frame for rotation about an axis of the first roller with the axis being mounted in fixed position in the frame;
- a second roller mounted in the conditioner frame for rotation about an axis of the second roller;
- a drive input for driving rotation of at least one of the first and second rollers;
- each respective end of the second roller being mounted on a respective mounting assembly arranged to allow movement of the respective end of the second roller relative to the first roller in a direction to increase and decrease spacing between the axes of the first and second rollers;
- each mounting assembly including:
  - a pivotal mounting member arranged to allow movement of the respective end of the second roller about a roller pivot axis generally parallel to the axis of the second roller and offset to one side thereof;
  - a tension link lying substantially in a radial plane of the roller pivot axis and having one end connected to the pivotal mounting member and extending therefrom in a direction so as to apply a force to the pivotal mounting member to move the second roller toward the first roller;
  - a tension spring for applying spring force to the tension link;
  - a bell crank mounted on the conditioner frame for pivotal movement of the bell crank, the bell crank having a first end connected to the tension link and a second end connected to the spring;
  - wherein the tension spring extends from the second end of the bell crank to a mounting point on the conditioner frame with the tension spring including an adjustment mechanism at the mounting point;
  - wherein there is provided a stop assembly for limiting movement of the second roller in a direction toward the first roller;
  - wherein the stop assembly includes an adjustment link extending to an adjustment point on the conditioner frame;
  - and wherein the mounting point of the tension spring is located on the conditioner frame adjacent the adjustment point of the adjustment link.

17. The conditioner according to claim 16 wherein the bell crank has a pivot axis at right angles to the roller pivot axis.

18. The conditioner according to claim 16 wherein each roller has a generally cylindrical roller surface and a plurality of side by side flutes at angularly spaced positions therearound, the flutes projecting radially outwardly to a flute edge spaced outwardly of the roller surface and extending generally longitudinally along the roller substantially along the full length thereof.

* * * * *